(12) United States Patent
Lin

(10) Patent No.: US 8,864,356 B2
(45) Date of Patent: Oct. 21, 2014

(54) BACKLIGHT MODULE

(75) Inventor: Hsin-Wu Lin, Hsinchu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 292 days.

(21) Appl. No.: 13/608,764

(22) Filed: Sep. 10, 2012

(65) Prior Publication Data

US 2013/0063971 A1 Mar. 14, 2013

(30) Foreign Application Priority Data

Sep. 13, 2011 (CN) .......................... 2011 1 0276679

(51) Int. Cl.
| | | |
|---|---|---|
| *G09F 13/04* | (2006.01) | |
| *G02F 1/13357* | (2006.01) | |
| *F21V 7/00* | (2006.01) | |
| *F21V 8/00* | (2006.01) | |
| *G02F 1/00* | (2006.01) | |

(52) U.S. Cl.
CPC ................ *F21V 7/00* (2013.01); *G02B 6/0011* (2013.01); *G09F 13/04* (2013.01); *G02F 1/00* (2013.01); *G02B 6/0056* (2013.01); *G02B 6/0068* (2013.01); *G02B 6/005* (2013.01)
USPC ............................. 362/606; 362/613; 362/621

(58) Field of Classification Search
USPC .......................... 362/606, 613, 619, 621, 622
See application file for complete search history.

(56) References Cited

U.S. PATENT DOCUMENTS

| | | | |
|---|---|---|---|
| 7,796,212 B2 | 9/2010 | Hwang et al. | |
| 2006/0091412 A1 | 5/2006 | Wheatley et al. | |
| 2006/0262565 A1* | 11/2006 | Shimura | 362/616 |
| 2010/0220459 A1 | 9/2010 | Jagt et al. | |
| 2010/0231826 A1* | 9/2010 | Itou et al. | 349/64 |

FOREIGN PATENT DOCUMENTS

| | | |
|---|---|---|
| CN | 1483150 A | 3/2004 |
| CN | 101506573 A | 8/2009 |
| CN | 101681056 A | 3/2010 |
| JP | 2010-33748 A | 2/2010 |
| TW | 200919025 | 5/2009 |
| TW | 200935630 | 8/2009 |
| TW | I322914 | 4/2010 |

\* cited by examiner

*Primary Examiner* — David V Bruce
(74) *Attorney, Agent, or Firm* — Muncy, Geissler, Olds & Lowe, P.C.

(57) ABSTRACT

A backlight module includes a light guide plate, a first light source device, and a second light source device. The first light source device is disposed adjacent to a first side surface of the light guide plate and has at least one first polarized light source for emitting a first polarized light beam. The second light source device is disposed adjacent to a second side surface of the light guide plate and has at least one second polarized light source for emitting a second polarized light beam. The light guide plate includes a first polarized light transmitting region adjacent to the second light source device and a second polarized light transmitting region adjacent to the first light source device.

13 Claims, 4 Drawing Sheets

BACKLIGHT MODULE

BACKGROUND OF THE INVENTION a. Field of the Invention

The invention relates to a backlight module in general and more specifically to a backlight module using a polarized light source.

b. Description of the Related Art

FIG. 5 shows a schematic diagram of a conventional edge-lighting type backlight module. Referring to FIG. 5, in a backlight module 100, a light source 102 is disposed adjacent to a side surface 104c of a light guide plate 104, and a light beam emitted by the light source 102 enters the light guide plate 104 and is deflected by micro dots 106 spread on a bottom surface 104b of the light guide plate 104. The micro dots 106 may destroy the condition of total internal reflection to allow the light beam to leave the light guide plate 104 via the light-emitting surface 104a. Commonly, the light source 102 may include at least one light-emitting diode. Since the current trend is towards an even brighter light-emitting diode, the number of light-emitting diodes used in the backlight module 100 is reduced. In that case, bright and dark regions in sharp contrast are liable to be formed to adversely affect image display as a light-mixing distance for light-emitting diodes is not sufficient. Further, since there is uneven distribution of the quality of light-emitting diodes with mass production, a light emitting diode with poor quality may, after being used for some time, break down first to result in apparent dark regions formed in front of the damaged light emitting diode to adversely affect image display.

Taiwan patent publication no. 200935630 discloses a light-emitting device using a polarized light-emitting diode as a light source, and a die of the light-emitting diode includes a polarizing layer, a light-blocking layer, and a reflective layer. Taiwan patent publication no. 200919025 discloses an optical film set including a diffusion film, a prism sheet, a reverse prism sheet, a brightness enhancement film, a non-multilayer reflective polarizer or a combination of at least two of them. The optical film set is disposed on a light guide plate. U.S. Pat. No. 7,796,212 discloses a liquid crystal display having a light source, a polarized light guide plate, a liquid crystal panel, and a diffusion film. The polarized light guide plate is allowed to polarize a light beam emitted by the light source. U.S. patent publication no. 20060091412 discloses a light-emitting diode package having a light-emitting diode chip and a light source, and the light source may emit a p-polarized light beam and an s-polarized light beam. However, the above conventional designs all suffer problems of insufficient light-mixing distances and dark regions as a result of a damaged light source.

BRIEF SUMMARY OF THE INVENTION

The invention provides a backlight module having long light-mixing distances and high luminous uniformity.

Other objects and advantages of the invention can be better understood from the technical characteristics disclosed by the invention. In order to achieve one of the above purposes, all the purposes, or other purposes, one embodiment of the invention provides a backlight module including a light guide plate, a first light source device, and a second light source device. The light guide plate has a light-emitting surface and a bottom surface opposite to the light-emitting surface and a first side surface and a second side surface opposite to the first side surface. Each of the first side surface and the second side surface is connected with the light-emitting surface. The first light source device is disposed adjacent to the first side surface and has at least one first polarized light source for emitting a first polarized light beam. The second light source device is disposed adjacent to the second side surface and has at least one second polarized light source for emitting a second polarized light beam. The light guide plate includes a first polarized light transmitting region and a second polarized light transmitting region, the first polarized light transmitting region is adjacent to the second light source device, the second polarized light transmitting region is adjacent to the first light source device, the first polarized light transmitting region is capable of reflecting the second polarized light beam and transmitting the first polarized light beam, and the second polarized light transmitting region is capable of reflecting the first polarized light beam and transmitting the second polarized light beam.

In one embodiment, the first polarized light beam is a p-polarized light beam, and the second polarized light beam is an s-polarized light beam.

In one embodiment, the first polarized light beam is a left-hand circularly polarized light beam, and the second polarized light beam is a right-hand circularly polarized light beam.

In one embodiment, a plurality of micro dots are formed on the bottom surface of the light guide plate.

In one embodiment, each of the first light source device and the second light source device includes a light-emitting diode light bar.

In one embodiment, an area of the first polarized light transmitting region is substantially equal to an area of the second polarized light transmitting region.

According to another embodiment of the invention, a backlight module includes a light guide plate, at least one first polarized light source, at least one second polarized light source, a first film, and a second film. The light guide plate has a light-emitting surface and a bottom surface opposite to the light-emitting surface and a first side surface and a second side surface opposite to the first side surface and each of the first side surface and the second side surface is connected with the light-emitting surface. The first polarized light source is disposed adjacent to the first side surface for emitting a first polarized light beam. The second polarized light source is disposed adjacent to the second side surface for emitting a second polarized light beam. The first film is formed on a part of at least one of the light-emitting surface and the bottom surface and capable of reflecting the second polarized light beam and transmitting the first polarized light beam. The second film is formed on a part of at least one of the light-emitting surface and the bottom surface, the second film is spaced apart from and does not overlap the first film, and the second film is capable of reflecting the first polarized light beam and transmitting the second polarized light beam.

In one embodiment, the first film is adjacent to the second polarized light source, and the second film is adjacent to the first polarized light source.

In conclusion, the embodiment or the embodiments of a backlight module have at least one of the following advantages.

According to the above embodiments, since a first polarized light beam is emitted via a first polarized light transmitting region (far away from a first polarized light source) and a second polarized light beam is emitted via a second polarized light transmitting region (far away from a second polarized light source), the polarized light sources may supply optical energy to an opposite end of the light guide plate far from themselves. Therefore, even though one of light sources breaks down, a dark region with dramatically-reduced brightness is not formed on the light guide plate and the performance of the image display remains. Further, according to the above embodiments, because light-emitting area of a polarized light source is at an opposite end of the light guide plate far from the polarized light source itself, a longer light-mixing distance is provided to improve luminous uniformity and avoid bright and dark regions in sharp contrast. In that case, the number of required light-emitting diodes is allowed to be reduced to lower the temperature of a backlight module, ease the thermal decay effect of light-emitting diodes, and therefore increase the luminous efficiency and service life of light-emitting diodes. Since each of the first polarized light transmitting region and the second polarized light transmitting region occupies half the light guide plate, micro dots are spread on half of the light guide plate with greater sizes and allow more flexibility in the selection of fabrication processes of the light guide plate.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
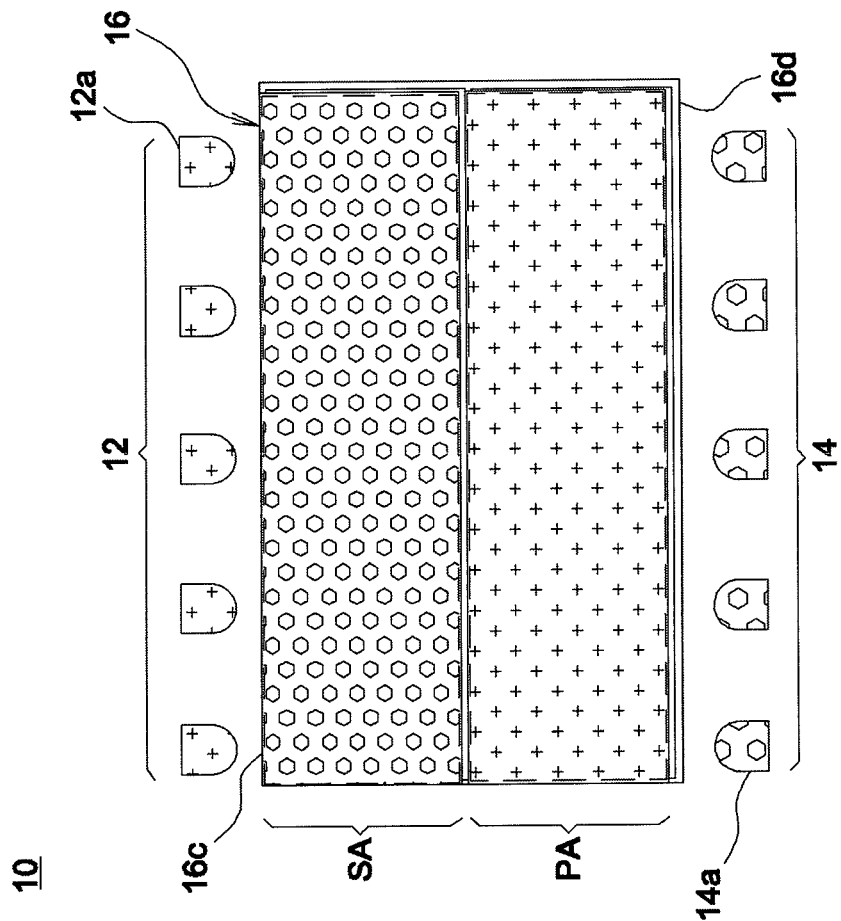
FIG. 1 shows a top view of a backlight module according to an embodiment of the invention.
Figure 2:
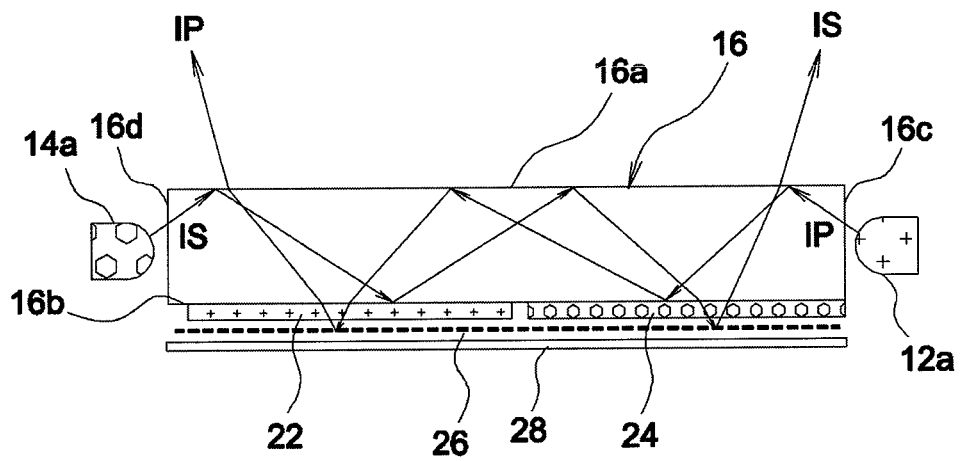
FIG. 2 shows a side view of the backlight module shown in FIG. 1.

FIG. 1 shows a top view of a backlight module according to an embodiment of the invention. FIG. 2 shows a side view of the backlight module shown in FIG. 1. Please refer to both FIG. 1 and FIG. 2, a backlight module 10 includes a first light source device 12, a second light source device 14, and a light guide plate 16. The light guide plate 16 includes a light-emitting surface 16a and a bottom surface 16b opposite to the light-emitting surface 16a and a first side surface 16c and a second side surface 16d opposite to the first side surface 16c. Each of the first side surface 16c and the second side surface 16d is connected with the light-emitting surface 16a. The first light source device 12 is disposed adjacent to the first side surface 16c, and the second light source device 14 is disposed adjacent to the second side surface 16d. The first light source device 12 may include at least one p-polarized light source 12a, and the second light source device 14 may include at least one s-polarized light source 14a. According to this embodiment, the light guide plate 16 includes a p-polarized light transmitting region PA and an s-polarized light transmitting region SA. The p-polarized light transmitting region PA is adjacent to the s-polarized light source 14a, and the s-polarized light transmitting region SA is adjacent to the p-polarized light source 12a. Further, there is no limitation in the area of each of the p-polarized light transmitting region PA and the s-polarized light transmitting region SA. In one embodiment, an area of the p-polarized light transmitting region PA is substantially equal to an area of the s-polarized light transmitting region SA. In one embodiment, the p-polarized light transmitting region PA is capable of transmitting a p-polarized light beam IP emitted by the p-polarized light source 12a and reflecting a s-polarized light beam IS emitted by the s-polarized light source 14a, and the s-polarized light transmitting region SA is capable of transmitting the s-polarized light beam IS and reflecting the p-polarized light beam IP. Therefore, the p-polarized light beam IP is continually reflected in the s-polarized light transmitting region SA until reaching the p-polarized light transmitting region PA, and then the p-polarized light beam IP travels through the p-polarized light transmitting region PA and is deflected by micro dots 26 spread on the bottom surface 16b of the light guide plate 16 to destroy the condition of total internal reflection and leave the light guide plate 16 as a result. In comparison, the s-polarized light beam IS is continually reflected in the p-polarized light transmitting region PA until reaching the s-polarized light transmitting region SA, and then the s-polarized light beam IS travels through the s-polarized light transmitting region SA and is deflected by the micro dots 26 spread on the bottom surface 16b of the light guide plate 16 to destroy the condition of total internal reflection and leave the light guide plate 16 as a result.

In one embodiment, as shown in FIG. 2, the p-polarized light transmitting region PA and the s-polarized light transmitting region SA are respectively formed by providing a first film 22 and a second film 24 on the bottom surface 16b of the light guide plate 16. The first film 22 is adjacent to the s-polarized light source 14a, and the second film 24 is adjacent to the p-polarized light source 12a. In one embodiment, an area of the first film 22 is substantially equal to an area of the second film 24. Further, in one embodiment, the second film 24 is spaced apart from and does not overlap the first film 22. The first film 22 is capable of transmitting the p-polarized light beam IP and reflecting the s-polarized light beam IS, and the second film 24 is capable of transmitting the s-polarized light beam IS and reflecting the p-polarized light beam IP. Therefore, as shown in FIG. 2, the p-polarized light beam IP emitted by the p-polarized light source 12a is continually reflected by the second film 24 in the s-polarized light transmitting region SA until reaching the p-polarized light transmitting region PA, and then the p-polarized light beam IP travels through the first film 22 and is deflected by the micro dots 26 spread on the bottom surface 16b of the light guide plate 16 to destroy the condition of total internal reflection and leave the light guide plate 16 as a result. In comparison, the s-polarized light beam IS emitted by the s-polarized light source 14a is continually reflected by the first film 22 in the p-polarized light transmitting region PA until reaching the s-polarized light transmitting region SA, and then the s-polarized light beam IS travels through the second film 24 and is deflected by the micro dots 26 spread on the bottom surface 16b of the light guide plate 16 to destroy the condition of total internal reflection and leave the light guide plate 16 as a result. Further, a reflective sheet 28 is disposed adjacent to the bottom surface 16b of the light guide plate 16 to reflect part light beams leaving the light guide plate 16 back to the light guide plate 16. Each of the first light source device 12 and the second light source device 14 may be a light-emitting diode light bar, and each of the p-polarized light source 12a and the s-polarized light source 14a may include a polarized light-emitting diode.

Figure 3:
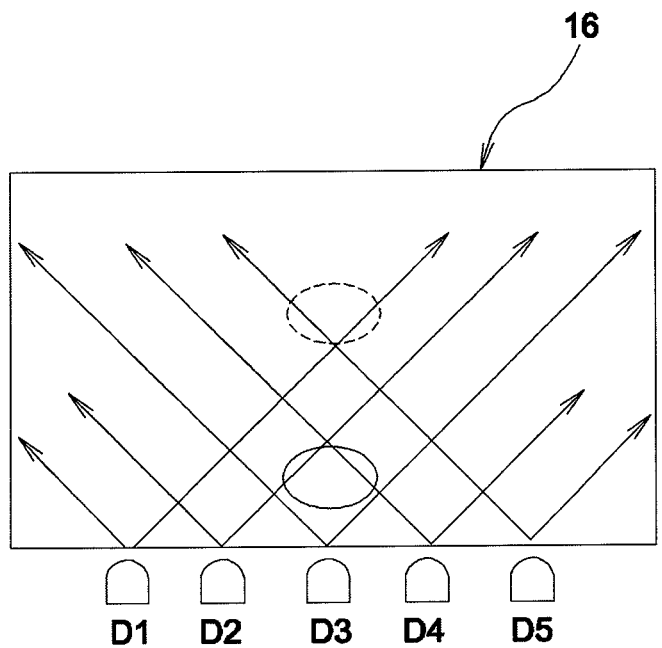
FIG. 3 shows a schematic diagram for explaining achieving effects of a backlight module according to an embodiment of the invention.
Figure 4:
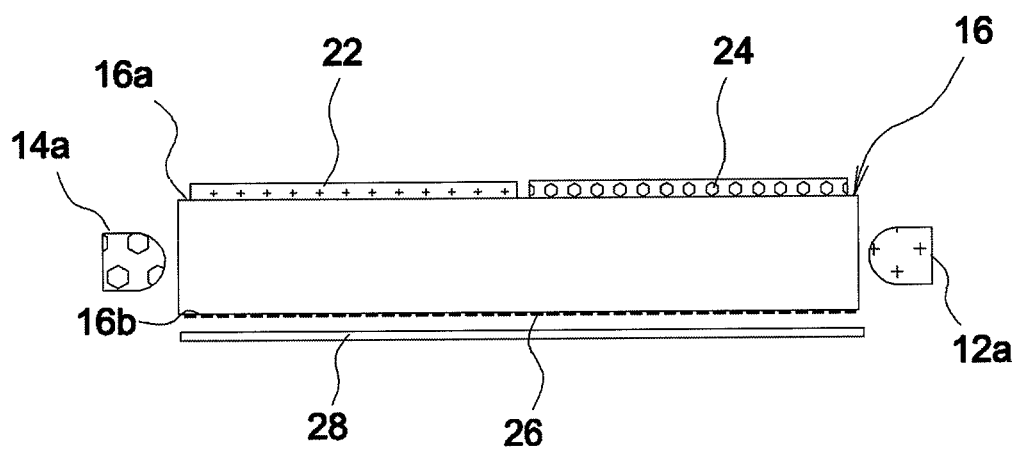
FIG. 4 shows a schematic diagram of a backlight module according to another embodiment of the invention.
Figure 5:
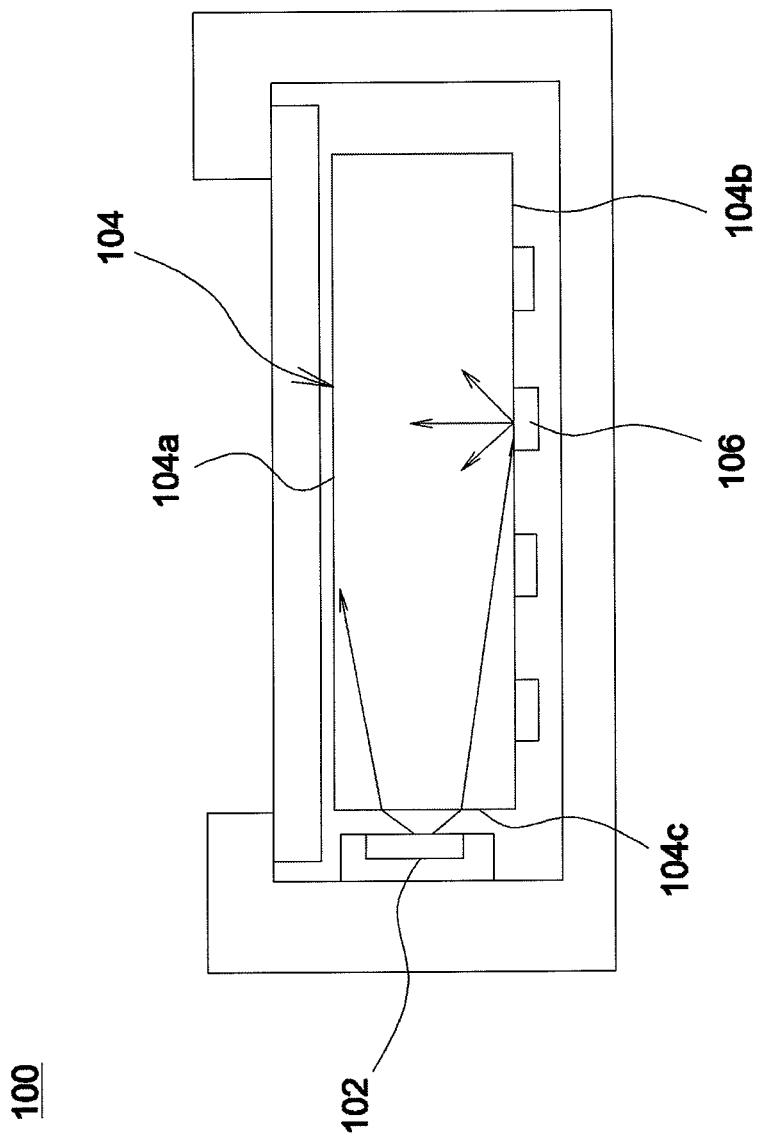
FIG. 5 shows a schematic diagram of a conventional backlight module.

Please refer to FIG. 3, taking light-emitting diodes D1-D5 as an example, the light-emitting diodes D1-D5 are arranged in a row beside the light guide plate 16. An area enclosed by a solid line is exemplified as an area neighboring the light-emitting diodes D1-D5, and an area enclosed by a dashed line is exemplified as an area far from the light-emitting diodes D1-D5. As shown in FIG. 3, optical energy in the area enclosed by a solid line is mainly supplied by the light-emitting diode D3, and the light-emitting diodes D2 and D4 play a subordinate role to supply optical energy. Therefore, once the light-emitting diode D3 breaks down, a dark region in sharp contrast is formed in the area enclosed by a solid line. In comparison, optical energy in the area enclosed by a dashed line is supplied by each of the light-emitting diodes D1-D5. Therefore, once either of the light-emitting diodes D1-D5 breaks down, the brightness in the area enclosed by a dashed line is only slightly reduced and not detected by human eyes. Under the circumstance, according to the above embodiments, since the p-polarized light beam IP is emitted via the p-polarized light transmitting region PA (far from the p-polarized light source 12a) and the s-polarized light beam IS is emitted via the s-polarized light transmitting region SA (far from the s-polarized light source 14a), the p-polarized light source 12a may supply optical energy to an opposite end of the light guide plate 16 far from the p-polarized light source 12a, and the s-polarized light source 14a may supply optical energy to an opposite end of the light guide plate 16 far from the s-polarized light source 14a. Therefore, even though one of multiple light sources breaks down, a dark region with dramatically-reduced brightness is not formed on the light guide plate 16 and performance of the image display remains. Further, according to the above embodiments, a light-emitting area of the polarized light source 12a is at an opposite end of the light guide plate 16 far from the polarized light source 12a itself, and a light-emitting area of the polarized light source 14a is at an opposite end of the light guide plate 16 far from the polarized light source 14a itself. Therefore, a longer light-mixing distance is provided to improve luminous uniformity and avoid bright and dark regions in sharp contrast. Further, in the above embodiments, the formation of a polarized light transmitting region is not limited. For example, as shown in FIG. 4, a first film 22 and a second film 24 of a backlight module 30 are separately disposed on the light-emitting surface 16a of the light guide plate 16 to form a p-polarized light transmitting region PA and an s-polarized light transmitting region SA, respectively. The distribution area of each of the first film 22 and the second film 24 is not limited, as long as the first film 22 does not overlap the second film 24. Further, the polarization states of light applied to the above embodiments are not limited to the p-polarization state and the s-polarization state. In an alternate embodiment, a left-hand circularly polarized light beam is incident to the first side surface 16c, and a right-hand circularly polarized light beam is incident to the second side surface 16d of the light guide plate 16. In that case, the light guide plate 16 may have a right-hand circularly polarized light transmitting region and a left-hand circularly polarized light transmitting region to achieve similar effects.

In conclusion, the embodiment or the embodiments of a backlight module have at least one of the following advantages.

According to the above embodiments, since a first polarized light beam is emitted via a first polarized light transmitting region (far from a first polarized light source) and a second polarized light beam is emitted via a second polarized light transmitting region (far from a second polarized light source), the polarized light sources may supply optical energy to an opposite end of the light guide plate far from themselves. Therefore, even though one of light sources breaks down, a dark region with dramatically-reduced brightness is not formed on the light guide plate and performance of the image display remains. Further, according to the above embodiments, a light-emitting area of a polarized light source is at an opposite end of the light guide plate far from the polarized light source itself. Therefore, a longer light-mixing distance is provided to improve luminous uniformity and avoid bright and dark regions in sharp contrast. Further, in that case, the number of required light-emitting diodes is allowed to be reduced to lower the temperature of a backlight module, ease the thermal decay effect of light-emitting diodes, and increase the luminous efficiency and service life of light-emitting diodes.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with a noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
   a light guide plate having a light-emitting surface and a bottom surface opposite to the light-emitting surface and a first side surface and a second side surface opposite to the first side surface, wherein each of the first side surface and the second side surface is connected with the light-emitting surface;
   a first light source device disposed adjacent to the first side surface and comprising at least one first polarized light source for emitting a first polarized light beam; and
   a second light source device disposed adjacent to the second side surface and comprising at least one second polarized light source for emitting a second polarized light beam, wherein the light guide plate comprises a first polarized light transmitting region and a second polarized light transmitting region, the first polarized light transmitting region is adjacent to the second light source device, the second polarized light transmitting region is adjacent to the first light source device, the first polarized light transmitting region is capable of reflecting the second polarized light beam and transmitting the first polarized light beam, and the second polarized light transmitting region is capable of reflecting the first polarized light beam and transmitting the second polarized light beam.

2. The backlight module as claimed in claim 1, wherein the first polarized light beam is a p-polarized light beam, and the second polarized light beam is an s-polarized light beam.

3. The backlight module as claimed in claim 1, wherein the first polarized light beam is a left-hand circularly polarized light beam, and the second polarized light beam is a right-hand circularly polarized light beam.

4. The backlight module as claimed in claim 1, further comprising:
   a plurality of micro dots formed on the bottom surface of the light guide plate.

5. The backlight module as claimed in claim 1, wherein each of the first light source device and the second light source device comprises a light-emitting diode light bar.

6. The backlight module as claimed in claim 1, wherein an area of the first polarized light transmitting region is substantially equal to an area of the second polarized light transmitting region.

7. A backlight module, comprising:
   a light guide plate having a light-emitting surface and a bottom surface opposite to the light-emitting surface and a first side surface and a second side surface opposite to the first side surface, wherein each of the first side surface and the second side surface is connected with the light-emitting surface;
   at least one first polarized light source disposed adjacent to the first side surface for emitting a first polarized light beam;
   at least one second polarized light source disposed adjacent to the second side surface for emitting a second polarized light beam;
   a first film formed on a part of at least one of the light-emitting surface and the bottom surface and the first film being capable of reflecting the second polarized light beam and transmitting the first polarized light beam; and
   a second film formed on a part of at least one of the light-emitting surface and the bottom surface, wherein the second film is spaced apart from and does not overlap the first film, and the second film is capable of reflecting the first polarized light beam and transmitting the second polarized light beam.

8. The backlight module as claimed in claim 7, wherein the first polarized light beam is a p-polarized light beam, and the second polarized light beam is an s-polarized light beam.

9. The backlight module as claimed in claim 7, wherein the first polarized light beam is a left-hand circularly polarized light beam, and the second polarized light beam is a right-hand circularly polarized light beam.

10. The backlight module as claimed in claim 7, wherein the first film is adjacent to the second polarized light source, and the second film is adjacent to the first polarized light source.

11. The backlight module as claimed in claim 7, further comprising:
    a plurality of micro dots formed on the bottom surface of the light guide plate.

12. The backlight module as claimed in claim 7, wherein each of the first polarized light source and the second polarized light source comprises a polarized light-emitting diode.

13. The backlight module as claimed in claim 7, wherein an area of the first film is substantially equal to an area of the second film.

* * * * *